3,702,852
CARBOXYLATED DIBENZOXAZEPINES AND DIBENZOTHIAZEPINES
Harry Louis Yale and Remesh Petigara, New Brunswick, N.J., assignors to E. R. Squibb & Sons, Inc., Princeton, N.J.
No Drawing. Filed Feb. 24, 1970, Ser. No. 13,767
Int. Cl. A61k 27/00; C07d 87/64, 93/42
U.S. Cl. 260—327 B                                   7 Claims

ABSTRACT OF THE DISCLOSURE

Disclosed herein are dibenzoxazepine and dibenzothiazepine derivatives which are substituted in the 5-position with a carboxyalkylene group. These compounds have been found to stimulate the central nervous system and to produce analgesia.

SUMMARY OF INVENTION

This invention relates to dibenzoxazepine derivatives having the Formula I:

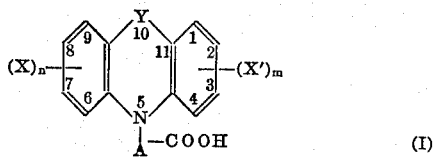

wherein A is lower alkylene (e.g., from 1 to 6 carbons); X and X' are halogen (e.g., chloro-, bromo-, iodo and fluoro-) or halo-alkyl, e.g., $CF_3$, Y is O or S; $m$ and $n$ are 0, 1 or 2.

The terms "lower alkylene" and "lower alkyl" when utilized in this invention refer to straight or branched chain hydrocarbon groups of from about one to six carbon atoms, such as methylene, ethylene, propylene, isopropylene, butylene, isobutylene, amylene, and the like. Halogen refers to fluoro, chloro-, bromo- or iodo.

It has been widely recognized that very special chemical structural requirements are essential for a substance to pass the mysterious blood-brain barrier and to enter the central nervous system. Many of the ataractic agents in current use, for example, possess strongly basic side chains and it is generally assumed that this is an essential structural requirement for entrance into the brain. It is therefore somewhat surprising to find that the compounds of this invention, possessing a carboxylic acid group on the side chain, readily pass the blood-brain barrier to produce central nervous system stimulation and analgesia.

The compounds of this invention can be administered perorally or by any other notable means, e.g., tablets, in amounts of from about 10 mg./kg. of body weight to about 35 mg./kg. of body weight and preferably can be utilized in a manner similar to imipramine.

The compounds of this invention are prepared by several methods. Thus, reacting compounds having the Formula II:

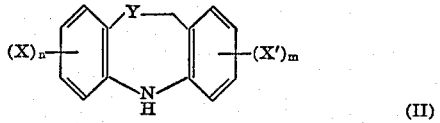

with a nitrile of Formula III (e.g., acrylonitrile, 2-methylacrylonitrile, 2-isopropylacrylonitrile, 2-pentylacrylonitrile, and so forth):

wherein R is H or a lower alkyl group (e.g., straight or branched chain from about 1 to 6 carbons) yields compounds of Formula IV:

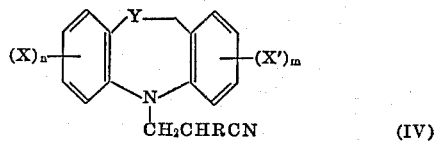

wherein $n$, $m$, X, X', Y and R are as defined herein.

This reaction is carried out by employing an excess of the nitrile $CH_2$:CHRCN as the solvent. The temperature utilized in the reaction can be varied from about 0° to about 100° C. with the preferred range being between about 0° and about 75° C. This reaction proceeds expeditiously when a small amount (up to about 1%) of a strong base like sodium hydroxide, sodium methoxide, potassium t-butoxide, or benzyl trimethylammonium hydroxide (Triton B) is used as the catalyst.

Compounds with the nitrile structure (IV) are converted to carboxylic acid of Formula I by heating at reflux temperatures with sufficient aqueous or alcoholic alkali metal hydroxide, e.g., sodium hydroxide or potassium hydroxide in methanol or ethanol.

However, the preferred procedure for preparing compounds of Formula I is to treat the compounds of structure IV with alcoholic hydrogen halide, such as hydrogen chloride in methanol, ethanol, and so forth, at room temperature whereby esters of the structure V are formed. By saponifying Compound V with an alkali metal hydroxide, e.g., sodium hdyroxide, lithium hydroxide, and so forth, the desired carboxylic acids of structure I can be recovered:

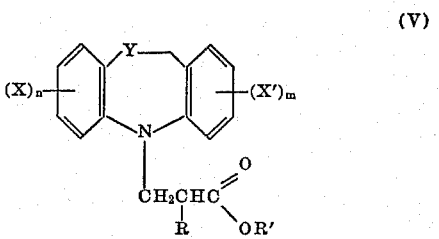

where in $m$, $n$, R, X, X', and Y are as defined above and R' is lower alkyl.

Alternatively, a general procedure for preparing the compounds of structure I which may be utilized is to react the compounds having Formula II with a haloalkylenecyanide of the general structure VI where X" is halogen, e.g., chloro, iodo, bromo; and A is as defined herein. This yields a nitrile of Formula IV:

Examples of haloalkylenecayanide reagents that may be utilized are 3-chloropropionitrile, 3-bromobutyronitrile, and so forth. The reaction may be carried out in an alcohol, such as ethanol, propanol, and so forth, as the solvent, in the presence of at least one molar equivalent of anhydrous potassium carbonate, or in an aromatic solvent like benzene, toluene, or xylene, using at least one molar equivalent of alkali metal hydroxide, e.g., sodium hydride, lithium hydride, and so forth, or alkali metal amine, e.g., sodium amide or in an aliphatic ketone like acetone or ethyl methyl ketone using at least one molar equivalent of powdered alkali metal hydroxide, e.g., sodium hydroxide or lithium hydroxide. The desired temperature in these reactions is between 60° and 150° C. The compounds of Formula IV prepared by these reactions may be thereafter treated as indicated above to yield compounds of Formula I.

Examples of dibenzoxazepines and dibenzthiazepines that can be utilized in the practice of this invention are 7-chloro-5,11 dihydrodibenz[b,e][1,4]oxazepine;
7,8-dichloro-5,11-dihydrodibenz[b,e][1,4]oxazepine;
3-chloro-5,11-dihydrodibenz[b,e][1,4]oxazepine;
3-bromo-7-chloro-5,11-dihydrodibenz[b,e][1,4]oxazepine;
7-trifluoromethyl-5,11-dihydrodibenz[b,e][1,4]oxazepine;

and so forth;

7-chloro-5,11-dihydrodibenz[b,e][1,4]thiazepine;
2-bromo-3-chloro-5,11-dihydrodibenz[b,e][1,4]thiazepine;
3-choloro-5,11-dihydrodibenz[b,e][1,4]thiazepine;
7-trifluoromethyl-5,11-dihydrodibenz[b,e][1,4]thiazepine;

and so forth.

The following examples are illustrative of the invention, all temperatures in degrees centigrade:

EXAMPLE 1

7-chloro-5,11-dihydrodibenz[b,e][1,4]oxazepine-5-propionic acid (a) 7-chloro-5,11 - dihydrodibenz[b,e][1,4]oxazepine-5-propionitrile.—A suspension of 17.4 g. of 7-chloro-5,11-dihydrodibenz[b,e][1,4]oxazepine in 35 ml. of acrylonitrile is cooled to 0–5°. To this is added with efficient stirring and cooling 0.2 ml. of Triton B. The suspension becomes homogeneous and a red solution results with the rise of temperature to 10°. The reaction mixture is allowed to come to room temperature and then refluxed for one hour with stirring. The excess of acrylonitrile is removed by known means, water is added, and the solid is filtered. The solid is dried, powdered, and extracted with five 400 ml. portions of diethyl ether. The diethyl ether extracts are dried and concentrated to a volume of 250 ml. The white crystalline compound is filtered. The filtrate is again concentrated and the resulting solid is filtered. The yield of the combined desired products is 21.5 g., M.P. about 131–132°.

(b) 7-chloro-5,11-dihydrodibenz[b,e][1,4]oxazepine-5-propionic acid, methyl ester.—The product from (a), 7-chloro-5,11-dihydrodibenz[b,e][1,4]oxazepine-5 - propionitrile, 71.10 g., is dissolved in 1200 ml. of dry dioxane and to this 800 ml. of 30% methanolic hydrogen chloride is added. The solution is stirred for 72 hours, 30 ml. of $H_2O$ is added, the mixture is stirred for 0.5 hour, concentrated in vacuo to 400 ml., filtered, and the filtrate concentrated to dryness in vacuo. The residue solidifies on keeping to yield the product 67.5 g., M.P. about 70–72°.

(c) 7-chloro-5,11-dihydrodibenz[b,e][1,4]oxazepine-5-propionic acid.—The product from (b), 7-chloro-5,11-dihydrodibenz[b,e][1,4]oxazepine - 5 - propionic acid, methyl ester, 25.4 g. of dissolved in 2200 ml. of MeOH and to this 5.6 g. of KOH dissolved in 300 ml. of $H_2O$ is added. The solution is refluxed for 4 hours, and then is concentrated in vacuo. The residue is taken up in 600 ml. of $H_2O$, the solution is cooled, and then acidified with 2% aqueous HCl. The solid is filtered and dissolved in 600 ml. of $C_6H_6$. This solution is treated with Darco and then extracted with 600 ml. of 2% aqueous NaOH solution. The extracts are treated with Darco and Hyflo, filtered and the filtrate is acidified wtih 2% aqueous HCl. The solid is filtered and recrystallized from $C_6H_6$. The yield is 23.0 g., M.P. about 155.0–156.5°.

EXAMPLE 2

5,11-dihydro-7-(trifluoromethyl)dibenz[b,e][1,4]oxazepine-5-propionic acid (a) 5,11-dihydro-7 - (trifluoromethyl)dibenz[b,e][1,4]oxazepine-5-propionitrile.—To 50.0 g. of 5,11-dihydro-7-(trifluoromethyl)dibenz[b,e][1,4]oxazepine in 60 ml. of redistilled acrylonitrile is added in 5 minutes 0.80 ml. of Triton B. Subsequently, the mixture is heated for one hour under reflux and the product isolated by extraction with benzene to give 5,11-dihydro-7-(trifluoromethyl)dibenz[b,e][1,4]oxazepine-5-propionitrile, M.P. about 161–163°.

(b) 5,11-dihydro-7 - (trifluoromethyl)dibenz[b,e][1,4]oxazepine-5-propionic acid, methyl ester.—7 - trifluoromethyl-5,11-dihydrodibenz[b,e][1,4]oxazepine-5 - propionitrile, 15.0 g., is dissolved in 240 ml. of dry dioxane and to this 140 ml. of 30% methanolic hydrogen chloride is added. The solution is stirred for 36 hours, 6 ml. of $H_2O$ is added, stirred 0.5 hour, and then concentrated in vacuo to 120 ml. The solid is filtered, and the filtrate is concentrated to dryness in vacuo. The residual liquid is taken up in 200 ml. of diethyl ether, treated with Dacro and Hyflo, the diethyl ether solution is concentrated and the residue distilled in vacuo to give 5,11-dihydro-7-(trifluoromethyl)dibenz[b,e][1,4]oxazepine - 5 - propionic acid, methyl ester, B.P. about 166–168° (0.08 mm.), M.P. about 70.0–71.5°.

(c) 5,11-dihydro-7 - (trifluoromethyl)dibenz[b,e][1,4]oxazepine-5-propionic acid.—7-trifluoromethyl-5,11 - dihydrodibenz[b,e][1,4]oxazepine-5-propionic acid, methyl ester, 3.15 g., is dissolved in 315 ml. of methanol and to this 0.5 g. of potassium hydroxide dissolved in 25 ml. of water is added. The mixture is refluxed for 2.5 hours and then concentrated in vacuo. The residue is taken up in 250 ml. of water and this solution is acidified with 2% aqueous HCl to give 5,11-dihydro-7-(trifluoromethyl)dibenz[b,e][1,4]oxazepine-5-propionic acvid, M.P. about 94–96°.

EXAMPLE 3

5,11-dihydro-7-(trifluoromethyl)dibenz[b,e][1,4]-oxazepine-5-butyric acid (a) α,α,α - Trifluoro - 6'-hydroxy-m-formotoluidide.—Hydrogenation of 66.0 g. of α,α,α - trifluoro - 2 - nitro-p-cresol, 6.0 g. 5% Pd-C, and 150 ml. of absolute ethanol at 3.5 kg./cm.$^2$ is complete in one hour. To the filtered ethanol solution is added 94 ml. of 98–100% $HCO_2H$ and the ethanol distilled under $N_2$ by means of a steam bath until the still head temperature reaches 82°. The residual liquid is heated one hour under reflux, cooled somewhat, and poured with stirring on 270 g. of ice to give 55.3 g. of α,α,α-trifluoro-6'-hydroxy-m-formotoluidide, M.P. about 174–176°.

(b) 6' - [o - bromobenzyloxy] - α,α,α-trifluoro-m-formotoluide.—To 256.0 g. of the product from (a), 324.0 g. of o-bromobenzyl bromide, and 2600 ml. of absolute ethanol, is added in one hour, 69.8 g. of NaOMe in 750 ml. of absolute ethanol. The solution is stirred at room temperature for five hours and then is poured into 12 l. of water, agitated thoroughly, the solid is filtered, and air-dried to give 551.0 g. of product, M.P. about 159–160°.

(c) 5,11 - dihydro - 7 - (trifluoromethyl)dibenz[b,e][1,4]-oxazepine.—To 1960 ml. of N,N-dimethylformamide 164.0 g. of $K_2CO_3$, and 14.0 g. of copper bronze, under reflux, is added in two hours a solution of 233.0 g. of the product from (b) in 1960 ml. of N,N-dimethylformamide. During the addition, after one hour, an additional 86.0 g. of $K_2CO_3$ is added. Subsequently, stirring and heating under reflux are continued for 1.5 hours, the mixture is filteded hot, and the filtrate concentrated in vacuo to dryness. The residue consisting of 5,11-dihydro- 7 - (trifluoromethyl)dibenz[b,e][1,4]oxazepine - 5-carboxaldehyde is dissolved in 1560 ml. of 95% ethanol, 312 ml. of 25% aqueous sodium hydroxide; the mixture heated under reflux for one hour and again concentrated to dryness in vacuo. The residual solid is washed thoroughly with water, filtered, and air-dried to give 141.0 g. 5,11 - dihydro - 7 - (trifluoromethyl)dibenz[b,e][1,4]-oxazepine, M.P. about 126–127°.

(d) 5,11 - dihydro - 7 - (trifluoromethyl)dibenz[b,e][1,4]-oxazepine-5-butyronitrile.—To a suspension of 25.5 g. of the product from (c), 250 ml. of ethyl methyl ketone, 0.5 g. of copper-bronze and 16.0 g. of powdered NaOH is added dropwise in 0.5 hour 29.6 g. of 4-bromobutyronitrile. The mixture is stirred and refluxed for 10 hours, cooled, and filtered. The filtrate is concentrated in vacuo to remove all volatile material, and the residue is dissolved in 25 ml. of methanol to give 5,11-dihydro-7-(trifluoromethyl)dibenz[b,e][1,4]oxazepine - 5 - butyronitrile.

(e) 5,11 - dihydro - 7 - (trifluoromethyl)dibenz[b,e][1,4]oxazepine-5-butyric acid, methyl ester.—The product from (b), 80.5 g., is substituted for the 7-chloro-5,11-dihydrodibenz[b,e][1,4]oxazepine-5 - propionitrile in Example 1(b), to give 5,11-dihydro-7-(trifluoromethyl)dibenz[b,e][1,4]-oxazepine-5-butyric acid, methyl ester.

(f) 5,11 - dihydro - 7 - (trifluoromethyl)dibenz[b,e][1,4]oxazepine-5-butyric acid.—The product from (e), 27.3 g., substituted for the 7-chloro-5,11-dihydrodibenz[b,e][1,4]oxazepine-5-propionic acid, methyl ester in Example 1(c), gives 5,11-dihydro-7-(trifluoromethyl)dibenz[b,e][1,4]oxazepine-5-butyric acid.

EXAMPLE 4

3,7-dichloro-5,11-dihydrodibenz[b,e][1,4]oxazepine 5-acetic acid (a) 2-bromo-p-chlorotoluene and 2,5-dibromo-4-chlorotoluene.—To 508.0 g. of p-chlorotoluene and 50 g. of powdered iron powder at 25–30° is added 880.0 g. of bromine in 3.5 hours, the whole filtered, and the filtrate ($n_D^{25}$ 1.5850) distilled to give 456.3 g. of 2-bromo-p-chlorotoluene, B.P. about 105–110° (3 mm.), $n_D^{23}$ 1.5731. The residue from the 2-bromo-p-chlorotoluene distills at 180–185° (0.1 mm.) and crystallizes spontaneously. Recrystallization from hexane gives 247.5 g. of 2,5-dibromo-4-chlorotoluene, M.P. about 94–95°; its NMR spectrum showed two one proton singlets at τ 2.38 and 2.51, attributable, respectively, to the protons at $C_3$ and $C_6$, as well as the 3-proton singlet at 7.64 due to the methyl protons.

(b) 2-bromo-4-chlorobenzyl bromide.—To 453 g. of 2-bromo-p-chlorotoluene and 3.0 g. of benzoyl peroxide, heated in an oil bath at 120° and irradiated by a UV lamp, is added 360 g. of $Br_2$ in 4.5 hours, and the mixture purged with $N_2$ to give 2-bromo-4-chlorobenzyl bromide, $n_D^{25}$ 1.6215.

(c) 3,7 - dichloro - 5,11 - dihydrodibenz[b,e][1,4]oxazepine.—The subsequent steps in this synthesis followed the reported procedure [H. L. Yale and F. Sowinski, J. Med. Chem. 1, 609 (1964)] to give first 2-bromo-4-chlorobenzyl-4-chloro-2-nitrophenyl ether, M.P. about 165–167°, then the aniline hydrochloride, M.P. about 204–205°, and the formanilide, M.P. about 155–156°. A mixture of 23.0 g. of the formanilide, 51.0 g. of potassium carbonate, 1.58 g. of copper-bronze, and 450 ml. of diethylbenzene is stirred vigorously and heated under reflux for three hours, filtered, and the filtrate is concentrated to dryness in vacuo to give 13.1 g. of 3,7-dichloro-5,11 - dihydrodibenz[b,e][1,4]oxazepine - 5-carboxaldehyde. Then 13.1 g. of this product, 95% ethanol, and 10 ml. of 25% aqueous sodium hydroxide are heated under reflux for 0.5 hour and concentrated in vacuo to give 9.8 g. of 3,7-dichloro-5,11-dihydrodibenz[b,e][1,4]oxazepine, M.P. about 158–160°.

(d) 3,7 - dichloro - 5,11 - dihydrodibenz[b,e][1,4]oxazepine-5-acetic acid.—By substituting 15.1 g. of chloroacetonitrile for the 4-bromobutyronitrile in Example 3(d), there is obtained 3,7-dichloro-5,11-dihydrodibenz[b,e][1,4]oxazepine - 5 - acetonitrile. When equimolar amounts of the 5-acetonitrile derivative is then substituted for the 5-butyronitrile in Example 3(e), there is obtained 3,7 - dichloro - 5,11 - dihydrodibenz[b,e][1,4]oxazepine-5-acetic acid, methyl ester, and an equimolar amount of the 5-acetic acid, methyl ester substituted for the 5-butyric acid, methyl ester in Example 3(e) gives 3,7-dichloro-5,11-dihydrodibenz[b,e][1,4]oxazepine-5-acetic acid.

EXAMPLE 5

5,11-dihydrodibenz[b,e][1,4]oxazepine-5-propionic acid (a) 5,11 - dihydrodibenz[b,e][1,4]oxazepine - 5 - propionitrile.—The reaction is carried out by adding 0.9 ml. of Triton B to the chilled mixture of 30.4 g. of 5,11-dihydrodibenz[b,e][1,4]oxazepine in 90 ml. of acrylonitrile. The 5,11 - dihydrodibenz[b,e][1,4]oxazepine - 5 - propionitrile melts at about 138.0–139.5°.

(b) 5,11 - dihydrodibenz[b,e][1,4]oxazepine - 5 - propionic acid.—A solution of the propionitrile from (a), 5.0 g., 200 ml. of methanol and 2.24 g. of potassium hydroxide in 20 ml. of $H_2O$ is heated under reflux and then is worked up to give 5,11-dihydrodibenz[b,e][1,4]oxazepine-5-propionic acid, M.P. about 203–205°.

EXAMPLE 6

3-chloro-5,11-dihydrodibenz[b,e][1,4]ozazepine-5-propionic acid (a) 3 - chloro - 5,11 - dihydrodibenz[b,e][1,4]oxazepine - 5 - propionitrile.—A suspension of 24.4 g. of 3-chloro - 5,11 - dihydrodibenzo[b,e][1,4]oxazepine in 55 ml. of acrylonitrile is cooled to 0–5°. To this is added with efficient stirring, and cooling, 0.3 ml. of Triton B, pausing after each drop of addition. The temperature rises slowly from 3° to 14° and then rapidly to 45° within 5 minutes with the formation of red colored clear solution. The mixture is cooled to 5–10°, stirred for 5 minutes, allowed to come to room temperature and then slowly heated to reflux temperature. After 1 hour heating under reflux, the excess of acrylonitrile is removed in vacuo. The residue is extracted with 3–350 ml. portions of diethyl ether, the combined diethyl ether extracts are treated with 3.0 g. of Darco and 1.0 g. of Hyflo, filtered, the filtrate is dried, and concentrated to give 31.6 g. of 3-chloro - 5,11 - dihydrodibenz[b,e][1,4]oxazepine - 5 - propionitrile, B.P. about 200–210° (0.2 min.).

(b) 3 - chloro - 5,11 - dihydrodibenz[b,e][1,4]oxazepine - 5 - propionic acid, methyl ester.—By substituting 71.1 g. of the product from (a) for the 7-chloro-5,11-dihydrodibenz[b,e][1,4]oxazepine - 5 - propionitrile in Example 1(b), there is obtained 3-chloro-5,11-dihydrodibenz[b,e][1,4]oxazepine-5-propionic acid, methyl ester.

(c) 3 - chloro - 5,11 - dihydrodibenz[b,e][1,4]oxazepine - 5 - propionic acid.—The replacement in Example 1(c) of the 7 - chloro - 5,11 - dihydrodibenz[b,e][1,4]oxazepine-5-propionic acid, methyl ester with 25.4 of the product from (b) and then following the other details of the procedure, there is obtained 3-chloro-5,11-dihydrodibenz[b,e][1,4]oxazepine-5-propionic acid.

EXAMPLE 7

2-bromo-3-chloro-5,11-dihydrodibenz[b,e][1,4]oxazepineisobutyric acid (a) 2,5 - dibromo - 4 - chlorobenzyl bromide.—By substituting 650 g. of 2,5-dibromo-4-chlorotoluene (prepared in Example 4) for the 453 g. of 2-bromo-4-chlorotoluene in Example 4(b), there is obtained 2,5-dibromo-A-chlorobenzyl bromide.

(b) 2 - bromo - 3 - chloro - 5,11 - dihydrodibenz[b,e][1,4]oxazepine.—The subsequent steps in this synthesis followed the reported procedures (see Example 4) and gave in turn o - [2,5 - dibromo - 4 - chlorobenzyloxyformanilide, M.P. about 201–203° and 2-bromo-3-chloro-5,11 - dihydrodibenz[b,e][1,4]oxazepine, M.P. about 187–189°.

(c) 2 - bromo - 3 - chloro - 5,11 - dihydrodibenz[b,e][1,4]oxazepine-5-isobutyric acid.—Following the procedure of Example 2(a) but substituting 59.5 g. of 2-bromo-3 - chloro - 5,11 - dihydrodibenz[b,e][1,4]oxazepine for the 5,11 - dihydro - 7 - (trifluoromethyl)dibenz[b,e][1,4]oxazepine in that example and employing 65 ml. of methacrylonitrile in place of acrylinitrile, there is obtained 2-bromo - 3 - chloro - 5,11 - dihydrodibenz[b,e][1,4]oxazepine - 5 - isobutyronitrile. When the isobutyronitrile in equimolar quantity is substituted in the procedure of Example 2(b), there is obtained 2 - bromo - 3 - chloro - 5,11 - dihydrodibenz[b,e][1,4]oxazepine - 5 - isobutyric acid, methyl ester, and when the latter, in equimolar quantity is substituted in the procedure of Example 2(c), there is obtained the desired 2-bromo-3-chloro-5,11-dihydrodibenz[b,e][1,4]oxazepine-5-isobutyric acid.

EXAMPLE 8

7-chloro-5,11-dihydrodibenzo[b,e][1,4]thiazepine-5-(α-pentyl)propionic acid

Following the procedure of Example 2 but utilizing 7-chloro - 5,11 - dihydrodibenzo[b,e][1,4]thiazepine in lieu of 7 - chloro - 5,11 - dihydrodibenzo[b,e][1,4]oxazepine and α-pentylacrylonitrile in lieu of acrylonitrile the product formed in 7 - chloro - 5,11 - dihydrodibenzo[b,e][1,4]thiazepine - 5 - (α - pentyl)propionic acid. The procedure of Example 2(b) is then followed to give 27.3 g. of 7 - chloro - 5,11 - dihydrodibenzo[b,e][1,4]thiazepine-5-(α-pentyl)propionic acid, methyl ester.

The latter product, 26.9 g., is dissolved in 325 ml. of MeOH and to this 4.9 of KOH dissolved in 100 ml. of H₂O is added. The mixture is heated under reflux for 2.5 hours, concentrated in vacuo, and the residue taken in 250 ml. of H₂O. The solution is treated with Darco and Hyflo, filtered, and acidified with hydrochloric acid to give 22.7 g. of 7 - chloro - 5,11 - dihydrodibenzo[b,e][1,4]thiazepine-5-(α-pentyl)propionic acid.

EXAMPLE 9

3-chloro-5,11-dihydrodibenz[b,e][1,4]oxazepine-5-propionic acid (a) 2 - o - bromo - p - chlorobenzyloxy nitrophenyl ether.—To 192.0 g. of 2 - bromo - 4 - chlorobenzyl bromide and 105.0 g. of nitrophenol is added dropwise a solution of 60 ml. of 50% aqueous sodium hydroxide in 750 ml. of 95% ethanol. The mixture is then refluxed for 2 hours, cooled, the solid filtered, washed well with water, and dried to give 152.0 g. of product, M.P. about 120–122°.

(b) o - (2 - bromo - 4 - chlorobenzyloxy)aniline hydrochloride.—To 2200 ml. of 2-propanol, 120 ml. of H₂O, and 138.0 g. of the product from (a), heated to 50°, is added at 10 minute intervals, 5 portions, each portion consisting of 51.2 g. of iron powder and 5.2 ml. of concentrated hydrochloric acid. Subsequently, the mixture is refluxed 1 hour, filtered, the filtrate diluted with 72 ml. of concentrated hydrochloric acid, and cooled. The precipitated solid melts at 210–212°; concentration of the filtrate from this solid to about 1 l. and cooling gives additional solid, M.P. about 209–211°.

(c) 2' - (2 - bromo - 4 - chlorobenzyloxy)formanilide.—The above product from (b), 84.0 g., 34.0 g. of sodium formate, and 460.0 g. of 98–100% formic acid are heated under reflux for 3 hours, cooled, and poured on 1 kg. of ice. The solid is extracted into 2 l. of chloroform, the chloroform solution is dried, filtered, and the filtrate concentrated to give 59.8 g. of product, M.P. about 140–144°.

(d) 3 - chloro - 5,11 - dihydrodibenz[b,e][1,4]oxazepine.—Copper bronze, 0.70 g. and 4.36 g. of K₂CO₃ in 200 ml. of N,N-dimethylformamide is brought to reflux and with stirring, a solution of 10.8 g. of 2'-(2-bromo-4-chlorobenzyloxy)formanilide in 200 ml. of N,N-dimethylformamide is added over a period of 2 hours. After the first hour of the addition, 4.36 g. of K₂CO₃ is added. After the addition of the formanilide is completed, the suspension is stirred at reflux for 1.5 hours and then filtered hot. The solvent is removed from the filtrate in vacuo to give 12.3 g. solid; this is dissolved in 80 ml. of 95% EtOH and 16 ml. 25% aqueous sodium hydroxide solution. The solution is refluxed 1 hour, the EtOH is removed, the residue is slurried with 50 ml. of H₂O filtered, and washed with water. The crude product is dried to give 6.98 g. of 3 - chloro - 5,11 - dihydrodibenz[b,e][1,4]oxazepine, M.P. about 113–115°.

(e) Following the procedure of Example 1, but utilizing 3 - chloro - 5,11 - dihydrodibenz[b,e][1,4]oxazepine in lieu of 7 - chloro - 5,11 - dihydrodibenz[b,e][1,4]oxazepine the desired product is recovered.

EXAMPLE 10

Following the procedures of Example 1 but utilizing compounds of the formula illustrated in Column A in lieu of 7 - chloro-5,11-dihydrodibenz[b,e][1,4]oxazepine and compounds of the formula illustrated in Column B, the products recovered are as indicated in Column C:

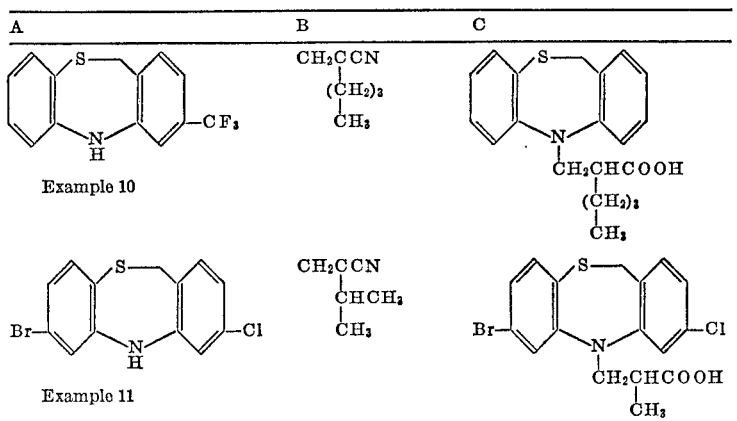

Utilizing the reagent illustrated in Column A in lieu of 5,11-dihydro - 7 - (trifluoromethyl)dibenz[b,e][1,4]oxazepine of Example 3 and the reagent in Column B in lieu of 4-bromobutyronitrile of Example 3 and following the procedures set forth therein the products recovered are as illustrated in Column C:

the name 7 - chloro-5,11-dihydrodibenz[b,e][1,4]oxazepine-5-propionic acid.

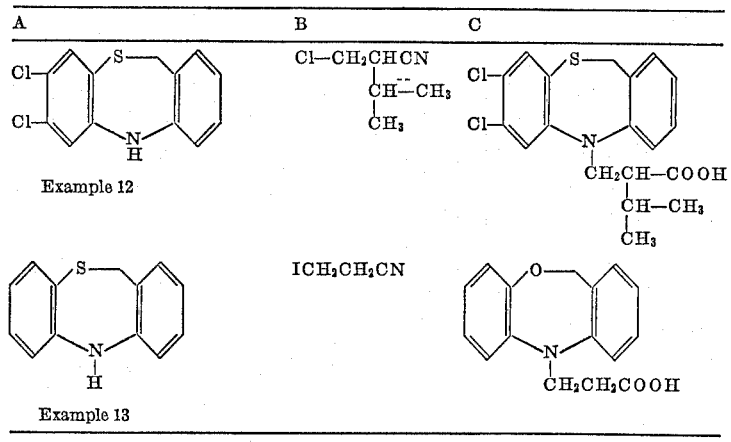

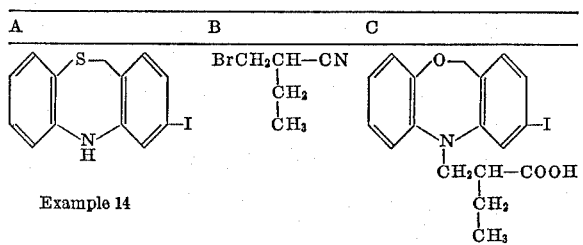

What is claimed is:

1. A compound having the formula

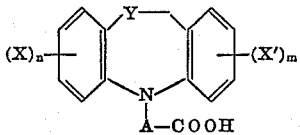

wherein A is lower alkylene; X and X' are halogen or lower halo-alkyl; Y is O or S; and m and n are 0, 1 or 2; and lower alkyl esters thereof.

2. A compound in accordance with claim 1 having the name 5,11 - dihydro-7-(trifluoromethyl)dibenz[b,e][1,4]oxazepine-5-propionic acid.

4. A compound in accordance with claim 1 having the name 5,11 - dihydro-7-(trifluoromethyl)dibenz[b,e][1,4]oxazepine-5-butyric acid.

5. A compound in accordance with claim 1 having the name 3,7 - dichloro-5,11-dihydrodibenz[b,e][1,4]oxazepine-5-acetic acid.

6. A compound in accordance with claim 1 having the name 7 - chloro-5,11-dihydrodibenz[b,e][1,4]oxazepine-5-propionic acid, methyl ester.

7. A compound in accordance with claim 1 having the name 5,11 - dihydro-7-(trifluoromethyl)dibenz[b,e][1,4]oxazepine-5-propionic acid, methyl ester.

References Cited

Smith, Open-Chain Nitrogen Compounds I (Benjamin, N.Y., 1965), pp. 23–6, 212.

HENRY R. JILES, Primary Examiner

C. M. SHURKO, Assistant Examiner

U.S. Cl. X.R.

260—333; 424—275, 278